United States Patent [19]

Harris

[11] Patent Number: 5,221,954
[45] Date of Patent: Jun. 22, 1993

[54] SINGLE PASS FULL COLOR PRINTING SYSTEM USING A QUAD-LEVEL XEROGRAPHIC UNIT

[75] Inventor: Ellis D. Harris, Claremont, Calif.
[73] Assignee: Xerox Corporation, Stamford, Conn.
[21] Appl. No.: 955,175
[22] Filed: Oct. 1, 1992
[51] Int. Cl.[5] ........................................... G03G 15/01
[52] U.S. Cl. .................................... 355/327; 346/157
[58] Field of Search ............................... 355/326–328; 346/157, 76 L; 430/42, 45; 118/645

[56] References Cited

U.S. PATENT DOCUMENTS

| | | | |
|---|---|---|---|
| 4,731,634 | 3/1988 | Stark | 355/3 |
| 4,901,100 | 2/1990 | DiBianca | 355/328 |
| 4,984,021 | 1/1991 | Williams | 355/328 X |
| 4,990,955 | 2/1991 | May et al. | 355/208 |
| 4,998,139 | 3/1991 | May et al. | 355/328 X |
| 5,049,949 | 9/1991 | Parker et al. | 355/328 |
| 5,113,202 | 5/1992 | Loce et al. | 346/157 X |
| 5,155,541 | 10/1992 | Loce et al. | 355/327 X |

OTHER PUBLICATIONS

Johnson et al., "Scophony Spatial Light Modulator", *Optical Engineering*, vol. 24, No. 1, Jan./Feb. 1985, pp. 93–100.

*Primary Examiner*—R. L. Moses
*Attorney, Agent, or Firm*—William Propp

[57] ABSTRACT

A four color toner single pass color printing system consists generally of a raster output scanner (ROS) optical system and a quad-level xerographic unit and a tri-level xerographic unit in tandem. The resulting color printing system would be able to produce pixels of black and white and all six primary colors. The color printing system uses a black toner and toners of the three subtractive primary colors or just toners of the three subtractive primary colors.

11 Claims, 4 Drawing Sheets

SINGLE PASS FULL COLOR PRINTING SYSTEM USING A QUAD-LEVEL XEROGRAPHIC UNIT

BACKGROUND OF THE INVENTION

The present invention relates generally to a single pass full color printing system and, more particularly, to a color printing system consisting generally of a raster output scanner (ROS) optical system and a quad-level xerographic unit and a tri-level xerographic unit in tandem which can print pixels producing black and white and all six primary colors.

In the practice of conventional bi-level xerography, it is the general procedure to form electrostatic latent images on a charge retentive surface such as a photoconductive member by first uniformly charging the charge retentive surface. The electrostatic charge is selectively dissipated in accordance with a pattern of activating radiation corresponding to original images. The selective dissipation of the charge leaves a bi-level latent charge pattern on the imaging surface where the high charge regions correspond to the areas not exposed by radiation. One level of this charge pattern is made visible by developing it with toner. The toner is generally a colored powder that adheres to the charge pattern by electrostatic attraction. The developed image is then fixed to the imaging surface, or is transferred to a receiving substrate such as plain paper, to which it is fixed by suitable fusing techniques.

In tri-level, highlight color imaging, unlike conventional xerography, upon exposure, three charge levels are produced on the charge-retentive surface. The highly charged (i.e. unexposed) areas are developed with toner, and the area more fully discharged is also developed, but with a toner of a different color. Thus, the charge retentive surface contains three exposure levels; zero exposure, intermediate exposure, and full exposure, which correspond to three charge levels. These three levels can be developed to print, for example, black, white, and a single color.

FIG. 1 is a schematic drawing of a prior art tri-level xerographic printing system. As shown, the system utilizes a charge retentive member in the form of a photoconductive belt 10, consisting of a photoconductive surface on an electrically conductive, light-transmissive substrate mounted for movement past a charge station A, an exposure station B, developer station C, transfer station D, and cleaning station F. Belt 10 moves in the direction of arrow 16 to advance successive portions thereof sequentially through the various processing stations disposed about the path of movement thereof. Belt 10 is entrained about a plurality of rollers 18, 20 and 22, the former of which can be used as a drive roller, and the latter of which can be used to provide suitable tensioning of the photoreceptor belt 10. Motor 23 rotates roller 18 to advance belt 10 in the direction of arrow 16. Roller 18 is coupled by motor 23 by suitable means such as a belt drive.

As can be seen by further reference to FIG. 2, initially successive portions of belt 10 pass through charging station A, where a corona discharge device such as a scorotron, corotron, or dicorotron, indicated generally by the reference numeral 24, charges the belt 10 to a selectively high uniform positive or negative potential, $V_0$. Any suitable control circuit, as well known in the art, may be employed for controlling the corona discharge device 24.

Next, the charged portions of the photoreceptor surface are advanced through exposure station B. At exposure station B, the uniformly charged surface of belt 10 is exposed by a tri-level raster output scanner (ROS) unit 25, which causes the charge retentive surface to be discharged in accordance with the output from the scanning device. This scan results in three separate discharge regions on the photoreceptor, each region exposed at one of three possible levels: (1) zero exposure which results in a voltage equal to $V_{ddp}$ and will be developed using charged-area-development (CAD); (2) full exposure, which results in a low voltage level $V_C$ and is developed using discharged-area-development (DAD); and (3) intermediate exposure, which yields an intermediate voltage level $V_W$ and does not develop and yields a white region on the print. These voltage levels are shown schematically in FIG. 2. Some typical voltage levels are as follows.

The photoreceptor, which is initially charged to a voltage $V_0$, undergoes dark decay to a level $V_{ddp}$ ($V_{CAD}$) equal to about $-900$ volts. When exposed at the exposure station B, the photoreceptor is discharged to $V_c$, ($V_{DAD}$) equal to about $-100$ volts in the highlight (i.e. color other than black) color portions of the image. The photoreceptor is also discharged to $V_w$ ($V_{white}$) equal to $-500$ volts imagewise in the background (i.e. white), image areas and in the inter-document area. Thus the image exposure is at three levels; zero exposure (i.e. black), intermediate exposure (white) and full exposure (i.e. color). After passing through the exposure station, the photoreceptor contains highly charged areas and fully discharged areas which correspond to CAD and DAD color latent images, and also contains an intermediate level charged area that is not developed.

At development station C, a development system, indicated generally by the reference numeral 30, advances developer materials into contact with the CAD and DAD electrostatic latent images. The development system 30 comprises first and second developer housings 32 and 34. The developer housing 32 contains a pair of magnetic brush rollers 35 and 36. The rollers advance developer material 40 into contact with the photoreceptor for developing the charged-area regions ($V_{CAD}$). The developer material 40, by way of example, contains positively charged black toner. Electrical biasing is accomplished via power supply 41, electrically connected to developer apparatus 32. A suitable DC bias, $V_{bb}$, of approximately $-600$ volts is applied to the rollers 35 and 36 via the power supply 41.

The developer housing 34 contains a pair of magnetic rolls 37 and 38. The rollers advance developer material 42 into contact with the photoreceptor for developing the discharged-area regions ($V_{DAD}$). The developer material 42, by way of example, contains negatively charged red toner. Appropriate electrical biasing is accomplished via power supply 43 electrically connected to developer apparatus 34. A suitable DC bias, $V_{cb}$, of approximately $-400$ volts is applied to the rollers 37 and 38 via the bias power supply 43.

Because the composite image developed on the photoreceptor consists of both positive and negative toner, a positive pre-transfer corona discharge member (not shown) is provided to condition the toner for effective transfer to a substrate, using positive corona discharge. The pre-transfer corona discharge member is preferably an AC corona device, biased with a DC voltage to operate in a field sensitive mode, to perform tri-level xerography pre-transfer charging in a way that selectively adds more charge (or at least comparable charge) to the region of the composite tri-level image that must have its polarity reversed. This charge discrimination is enhanced by discharging the photoreceptor carrying the composite developed latent image with light before the pre-transfer charging this minimizes the tendency to overcharge portions of the image which are already at the correct polarity.

Referring again to FIG. 1, a sheet of support material 58 is moved into contact with the toner image at transfer station D. The sheet of support material is advanced to transfer station D by conventional sheet feeding apparatus, not shown. Preferably, the sheet feeding apparatus includes a feed roll contacting the upper most sheet of a stack of copy sheets. Feed rolls rotate to advance the uppermost sheet from the stack into a chute, which directs the advancing sheet of support material into contact with the surface of belt 10 in a timed sequence, so that the developed toner powder image contacts the advancing sheet of support material at transfer station D.

Transfer station D includes a corona generating device 60 which sprays ions of a suitable polarity onto the backside of sheet 58. This attracts the charged toner powder images from the belt 10 to sheet 58. After transfer, the sheet continues to move in the direction of arrow 62 onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a backup roller 68. Sheet 58 passes between fuser roller 66 and backup roller 68, with the toner powder image contacting fuser roller 66. In this manner, the toner powder image is permanently affixed to sheet 58. After fusing, a chute, not shown, guides the advancing sheet 58 to a catch tray (also not shown), for subsequent removal from the printing machine by the operator.

After the sheet of support material is separated from the photoconductive surface of belt 10, the residual toner particles carried by the nonimage areas on the photoconductive surface are removed therefrom. These particles are removed at cleaning station F. A magnetic brush cleaner housing is disposed at the cleaner station F. The cleaner apparatus comprises a conventional magnetic brush roll structure for causing carrier particles in the cleaner housing to form a brush-like orientation relative to the roll structure and the charge retentive surface. It also includes a pair of detoning rolls for removing the residual toner from the brush.

Subsequent to cleaning, a discharge lamp (not shown) floods the photoconductive surface with light to dissipate any residual electrostatic charge remaining, prior to the charging thereof, for the successive imaging cycle. An illustrative example of a tri-level xerographic unit is found in U.S. Pat. No. 4,990,955, assigned to the same assignee as the present invention and herein incorporated by reference.

There are several scanning techniques known in the prior art to obtain the tri-level exposure imaging. A conventional flying spot scanner, such as used in the Canon 9030 uses a ROS unit to "write" an exposed image on a photoreceptive surface a pixel at a time. To obtain higher spatial resolution, a pulse imaging scanner can be utilized. This pulse imaging scanner is also referred to as a Scophony scanner in an article in Optical Engineering, Vol. 24, No. 1, January/February 1985, *Scophony Spatial Light Modulator*, by Richard Johnson et al., whose contents are hereby incorporated by reference. A preferred technique, capable of higher spatial resolution is to use similar optical elements as the flying spot scanner (rotating polygon, laser light source, pre-polygon and post-polygon optics), but with an A/O modulator which illuminates many pixels at a given time, resulting in a scanner with a coherent imaging response. With this type of scan system, the exposure level, or levels at the image surface, can be controlled by controlling the drive level of the A/O modulator dependent on the video data. In a tri-level system, two drive levels are used, one for the white exposure and a second higher drive level for the DAD exposure.

Alternately, instead of obtaining an intermediate exposure level by controlling the acoustic amplitude, an intermediate exposure can be provided by using pulse width modulation in a pulse imaging system in conjunction with spatial filtering.

In quad-level or four-level color imaging, upon exposure, four charge levels are produced on the charge-retentive surface. Thus, the charge retentive surface contains four exposure levels; zero exposure, a low intermediate exposure, a high intermediate exposure and full exposure, which correspond to the four charge levels. These three levels can be developed to print, for example, black, white, and two colors.

FIG. 3 is a schematic drawing of a prior art quad-level xerographic printing system 100. As shown, the system utilizes a charge retentive member in the form of a photoconductive belt 110, consisting of a photoconductive surface on an electrically conductive, light-transmissive substrate mounted for movement past a charge station A, an exposure station B, developer station C, transfer station D, and cleaning station F. Belt 110 moves in the direction of arrow 112 to advance successive portions thereof sequentially through the various processing stations disposed about the path of movement thereof. Belt 110 is entrained about a plurality of rollers 114, and 116, the former of which can be used as a drive roller, and the latter of which can be used to provide suitable tensioning of the photoreceptor belt 110. Motor 118 rotates roller 114 to advance belt 110 in the direction of arrow 112. Roller 114 is coupled by motor 118 by suitable means such as a belt drive.

As can be seen by further reference to FIG. 4, initially successive portions of belt 110 pass through charging station A, where a corona discharge device such as a scorotron, corotron, or dicorotron, indicated generally by the reference numeral 120, charges the belt 110 to a selectively high uniform positive or negative potential, $V_0$. Any suitable control circuit, as well known in the art, may be employed for controlling the corona discharge device 120.

Next, the charged portions of the photoreceptor surface are advanced through exposure station B. At exposure station B, the uniformly charged surface of belt 110 is exposed by a quad-level raster output scanner (ROS) unit 122, which causes the charge retentive surface to be discharged in accordance with the output from the scanning device.

The photoreceptor belt 110, which is initially charged to a voltage $V_{black}$ (approximately minus 1000 volts), is discharged to $V_w$ (approximately minus 700 volts) imagewise in the background (white) image areas and to $V_d$ (approximately minus 350 volts) and $V_a$ (approximately minus 100 volts) in the highlight (i.e. colors other than black) image areas.

At development station C in FIG. 3, a development system, indicated generally by the reference numeral 124, advances developer materials into contact with the electrostatic latent images on the photoreceptor belt 110. The development system 124 comprises first, second and third developer housings 126, 128 and 130. Preferably, each of the developer housings contains a pair of magnetic brush rollers 132 and 134. These rollers advance their respective developer materials into contact with the latent image.

By way of example, the first developer housing 126 contains positively charged black toner, the second developer housing 128 contains negatively charged magenta toner and the third developer housing 130 contains negatively charged cyan toner. The photoreceptor belt 110 containing the images from the exposure station B and the ROS unit 122 is moved past these housings 126, 128 and 130 in a single pass.

Color discrimination in the development of the electrostatic latent image is achieved by electrically biasing the three housings to suitable voltages for effecting the attraction of the desired toners to the different potentials on the charge retentive surface of the photoreceptor belt. Thus, the first developer housing 126 may be biased by a DC voltage, $V_b$, to approximately minus 800 volts, the second developer housing 128 may be biased by a DC voltage, $V_{c1}$, to approximately minus 300 volts and the third developer housing 130 may be biased by a DC voltage, $V_{c2}$, to approximately minus 600 volts.

The black toner from the first developer housing 126 is attracted to the $V_{black}$ voltage areas on the photoreceptor and repelled from the other two charged areas, $V_d$ and $V_a$. The positively charged black toner from the first developer housing 126 is attracted to the $V_{black}$ voltage areas on the photoreceptor belt which are at a charge level of minus 1000 volts since the bias on the first developer housing 126 is minus 800 volts. The positively charged black toner is attracted to the photoreceptor areas which are more negative than the developer housing. Conversely the positively charged black toner from the first developer housing is not attracted to the photoreceptor areas, $V_d$ (approximately minus 350 volts) and $V_a$ (approximately minus 100 volts), that are more positive than the first developer housing bias of minus 800 volts.

The magenta toner from the second developer housing 128 is attracted to the $V_a$ voltage areas on the photoreceptor and repelled from the other two charged areas, $V_d$ and $V_{black}$. The voltage level $V_a$ of minus 100 volts is less negative than the minus 300 volts of the second developer housing and the negative charge of the magenta toner. The magenta toner is not attracted to the photoreceptors areas of voltage levels $V_d$ of minus 350 volts because these areas are more negative than the minus 300 volts bias of the second developer housing and thus repell the magenta toner.

The cyan toner from the third developer housing 130 is attracted to both the $V_a$ and the $V_d$ voltage areas on the photoreceptor. The voltage levels of $V_d$ of minus 350 volts and $V_a$ of minus 100 volts are both more positive than the minus 600 volts bias of the third developer housing 130 and the negatively charged cyan toner.

Thus, the $V_{black}$ voltage areas on the photoreceptor attracts the black toner from the first developer housing 126 to produce a black color image. The $V_d$ voltage areas on the photoreceptor attracts the cyan toner from the third developer housing 130 to produce a cyan color image. The $V_a$ voltage areas photoreceptor attracts the magenta toner from the second developer housing 128 and the cyan toner from the third developer housing 130 to produce a blue color image. The areas of the photoreceptor charged to $V_w$ of minus 700 volts are not developed by any of the toners because the biasing of the toner housings and the polarities of the toners.

Thus, the quad-level xerographic unit 100, where the voltages of the color highlight areas on the photoreceptor and the color developer housing biases are between the white voltage level and ground, will produce black, white, cyan (the color of the toner whose housing bias is closest to white) and blue (a mixture of cyan and magenta).

Because the composite image developed on the photoreceptor consists of both positive and negative toner, a positive pre-transfer corona discharge member 136 is provided to condition the toner for effective transfer to a substrate, using positive corona discharge. The pre-transfer corona discharge member is preferably an AC corona device, biased with a DC voltage to operate in a field sensitive mode, to perform xerography pre-transfer charging in a way that selectively adds more charge (or at least comparable charge) to the region of the composite image that must have its polarity reversed. This charge discrimination is enhanced by discharging the photoreceptor carrying the composite developed latent image with light before the pre-transfer charging this minimizes the tendency to overcharge portions of the image which are already at the correct polarity.

Referring again to FIG. 3, a sheet of support material 138 is moved into contact with the toner image at transfer station D. The sheet of support material is advanced to transfer station D by conventional sheet feeding apparatus, not shown. Preferably, the sheet feeding apparatus includes a feed roll contacting the upper most sheet of a stack of copy sheets. Feed rolls rotate to advance the uppermost sheet from the stack into a chute, which directs the advancing sheet of support material into contact with the surface of belt 110 in a timed sequence, so that the developed toner powder image contacts the advancing sheet of support material at transfer station D.

Transfer station D includes a corona generating device 140 which sprays ions of a suitable polarity onto the backside of sheet 138. This attracts the charged toner powder images from the belt 110 to sheet 138. After transfer, the sheet continues to move in the direction of arrow 142 onto a conveyor (not shown) which advances the sheet to fusing station E.

Fusing station E includes a fuser assembly, indicated generally by the reference numeral 144, which permanently affixes the transferred powder image to sheet 138. Preferably, fuser assembly 144 comprises a heated fuser roller 146 and a backup roller 148. Sheet 138 passes between fuser roller 146 and backup roller 148, with the toner powder image contacting fuser roller 146. In this manner, the toner powder image is permanently affixed to sheet 138. After fusing, a chute, not shown, guides the advancing sheet 138 to a catch tray (also not shown), for subsequent removal from the printing machine by the operator.

After the sheet of support material is separated from the photoconductive surface of belt 110, the residual toner particles carried by the non-image areas on the photoconductive surface are removed therefrom. These particles are removed at cleaning station F. A magnetic brush cleaner housing 150 is disposed at the cleaner station F. The cleaner apparatus comprises a conventional magnetic brush roll structure for causing carrier particles in the cleaner housing to form a brush-like orientation relative to the roll structure and the charge retentive surface. It also includes a pair of detoning rolls for removing the residual toner from the brush.

Subsequent to cleaning, a discharge lamp (not shown) floods the photoconductive surface with light to dissipate any residual electrostatic charge remaining, prior to the charging thereof, for the successive imaging cycle. An illustrative example of a quad-level xerographic unit is found in U.S. Pat. No. 4,731,634, commonly assigned with this application and herein incorporated by reference.

A quad-level xerographic unit, unlike the bi-level and tri-level, does not produce color images that match the toner colors. Two of the toner colors are produced while the third color produced is a combination of one of those first two toner colors and a third toner color.

A raster output scanner (ROS) optical system for creating tri-level exposures at a recording medium typically prints black, white, and a single color. A raster output scanner optical system for creating quad-level exposures at a recording medium typically prints black, white, and two colors. However, a full color process would print the six primary colors of cyan, yellow, magenta, blue, green, and red, in addition to black and white.

It is an object of this invention to provide a color printing system using a quad-level xerographic unit.

It is another object of this invention to provide a color printing system using a quad-level xerographic unit and a tri-level xerographic unit.

It is still another object of this invention to provide a full color printing system.

It is still another object of this invention to provide a single pass color printing system which will increase the pages per minute printing and will reduce the number and cost of optical and xerographic components.

SUMMARY OF THE INVENTION

In accordance with the present invention, a single pass full color printing system consists generally of a raster output scanner (ROS) optical system and a quad-level xerographic unit and a tri-level xerographic unit in tandem.

A full color printing system would be able to produce pixels of black and white and all six primary colors; red, green, blue, cyan, magenta and yellow using four color toners: black and the three subtractive primary colors of cyan, magenta and yellow. Pixels of the additive primary colors of blue, red and green would be produced by toner dot upon toner dot of a combination of the three subtractive primary color toners. The printing system can also produce full color using just the three subtractive primary colors.

A single pass full color printing system can also consist generally of a raster output scanner (ROS) optical system and a quad-level xerographic unit and a bi-level xerographic unit in tandem or a raster output scanner (ROS) optical system and two quad-level xerographic units.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
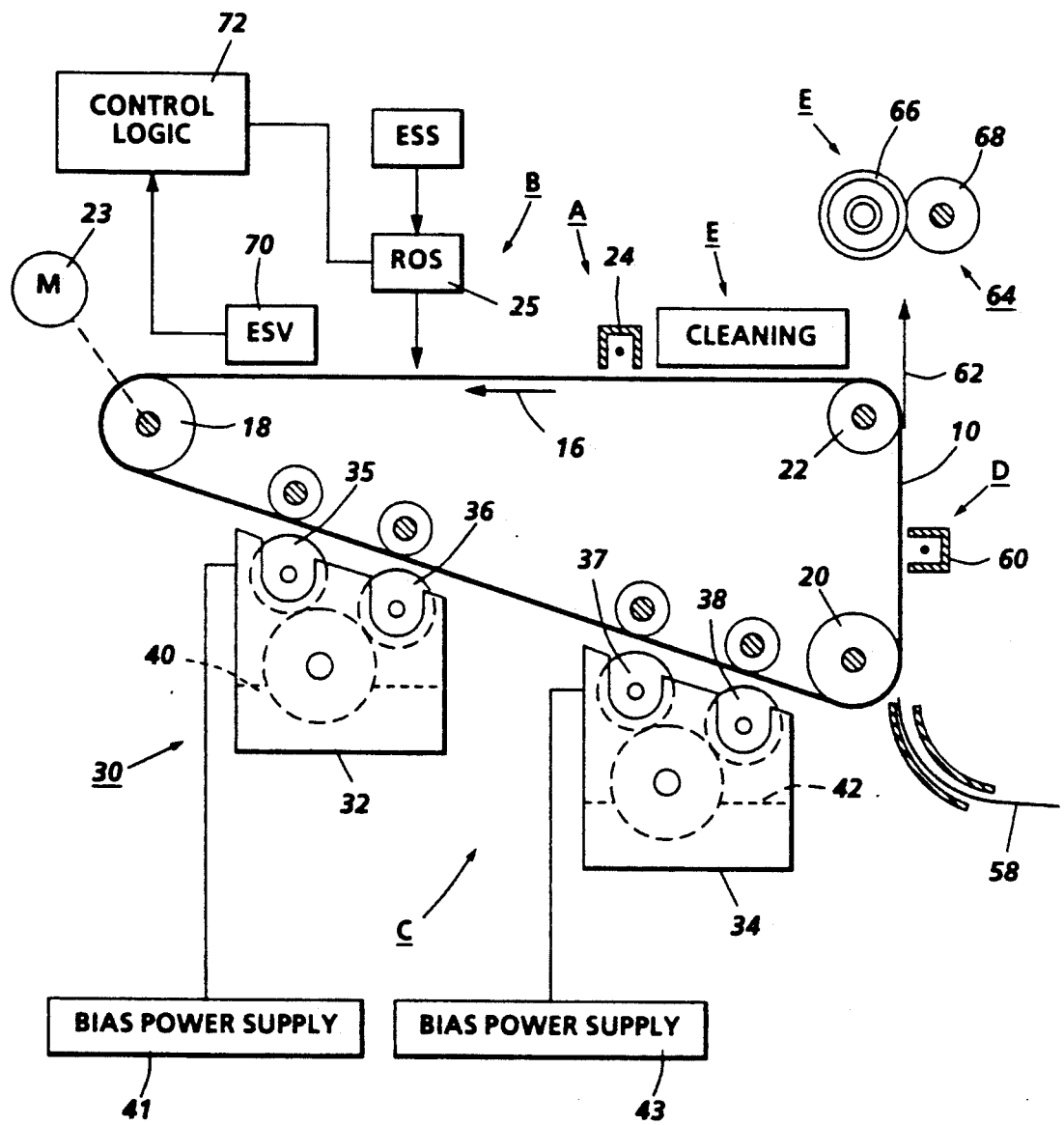
FIG. 1 is a schematic view of a prior art tri-level imaging system.
Figure 2A:
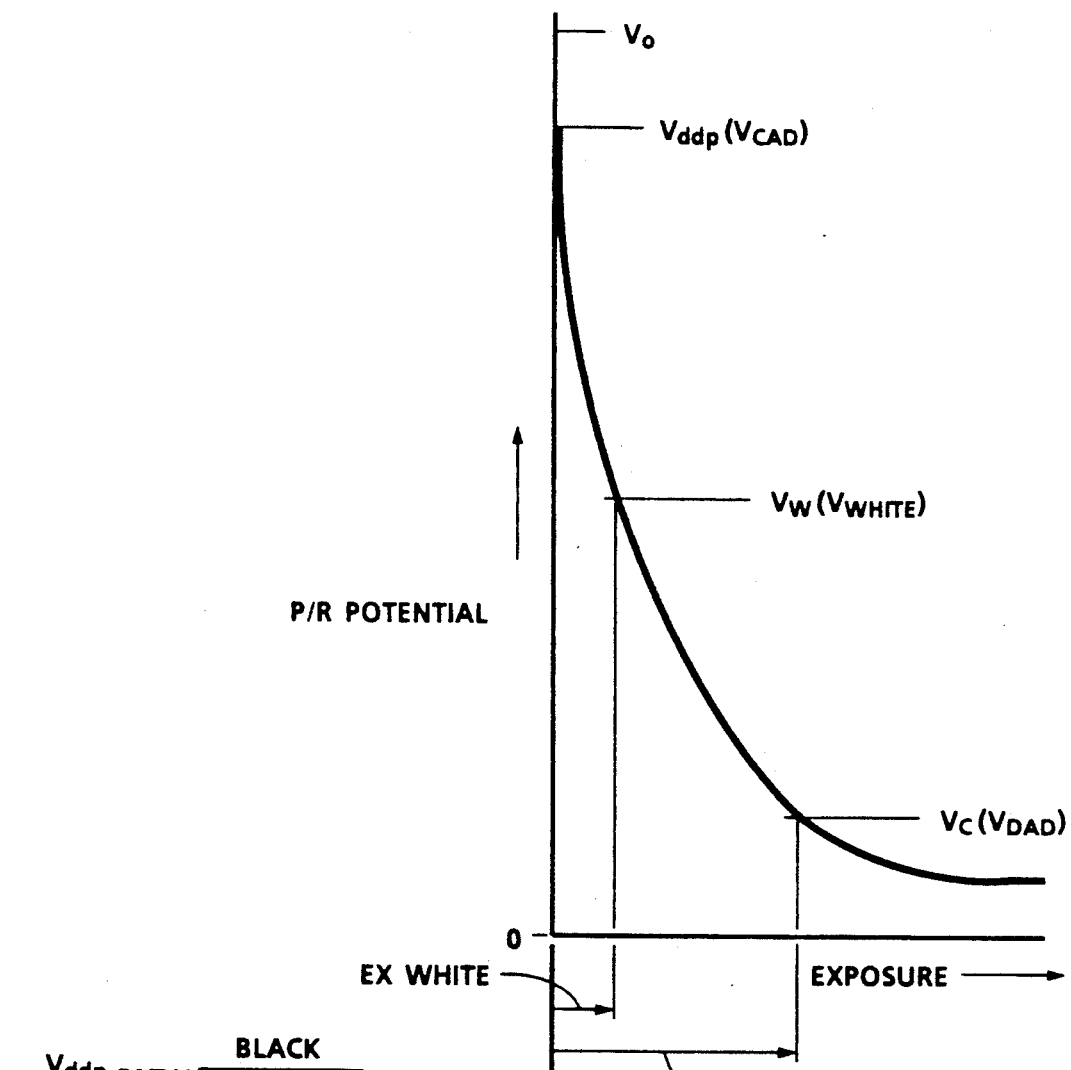
FIG. 2a and 2b show three voltage discharge levels obtained by the exposure system of FIG. 1.
Figure 2B:
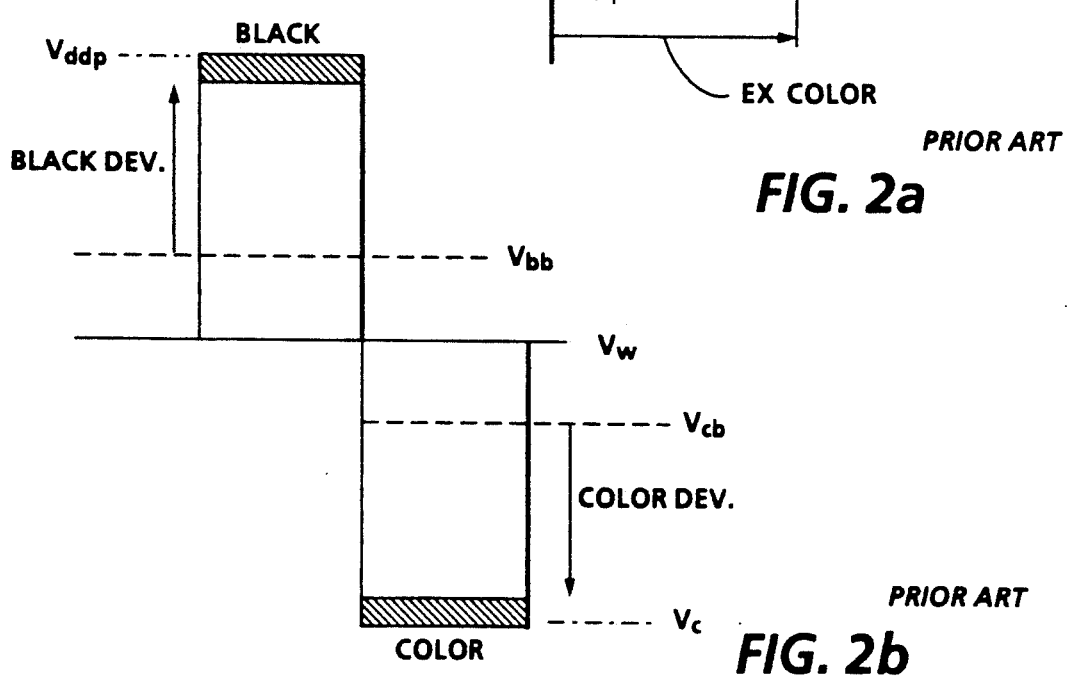
Figure 3:
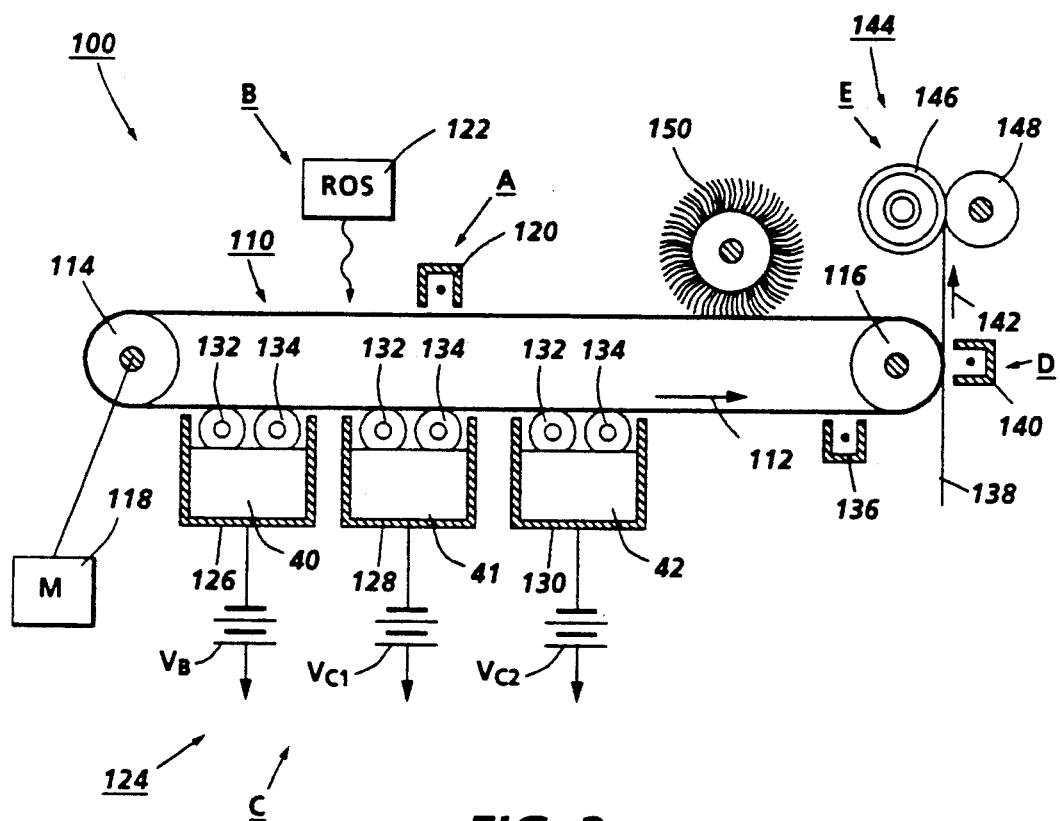
FIG. 3 is a schematic view of a prior art quad-level imaging system.
Figure 4:
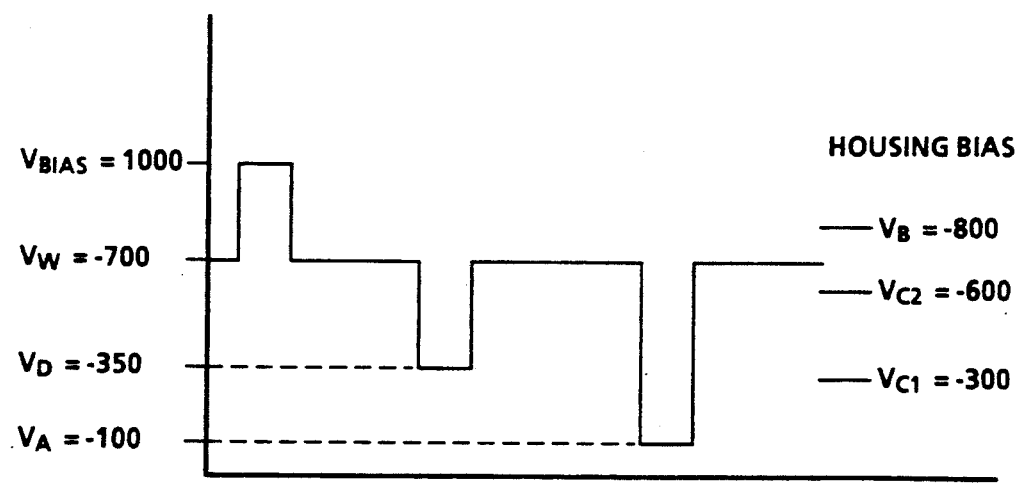
FIG. 4 shows four voltage discharge levels obtained by the exposure system of FIG. 3.
Figure 5:
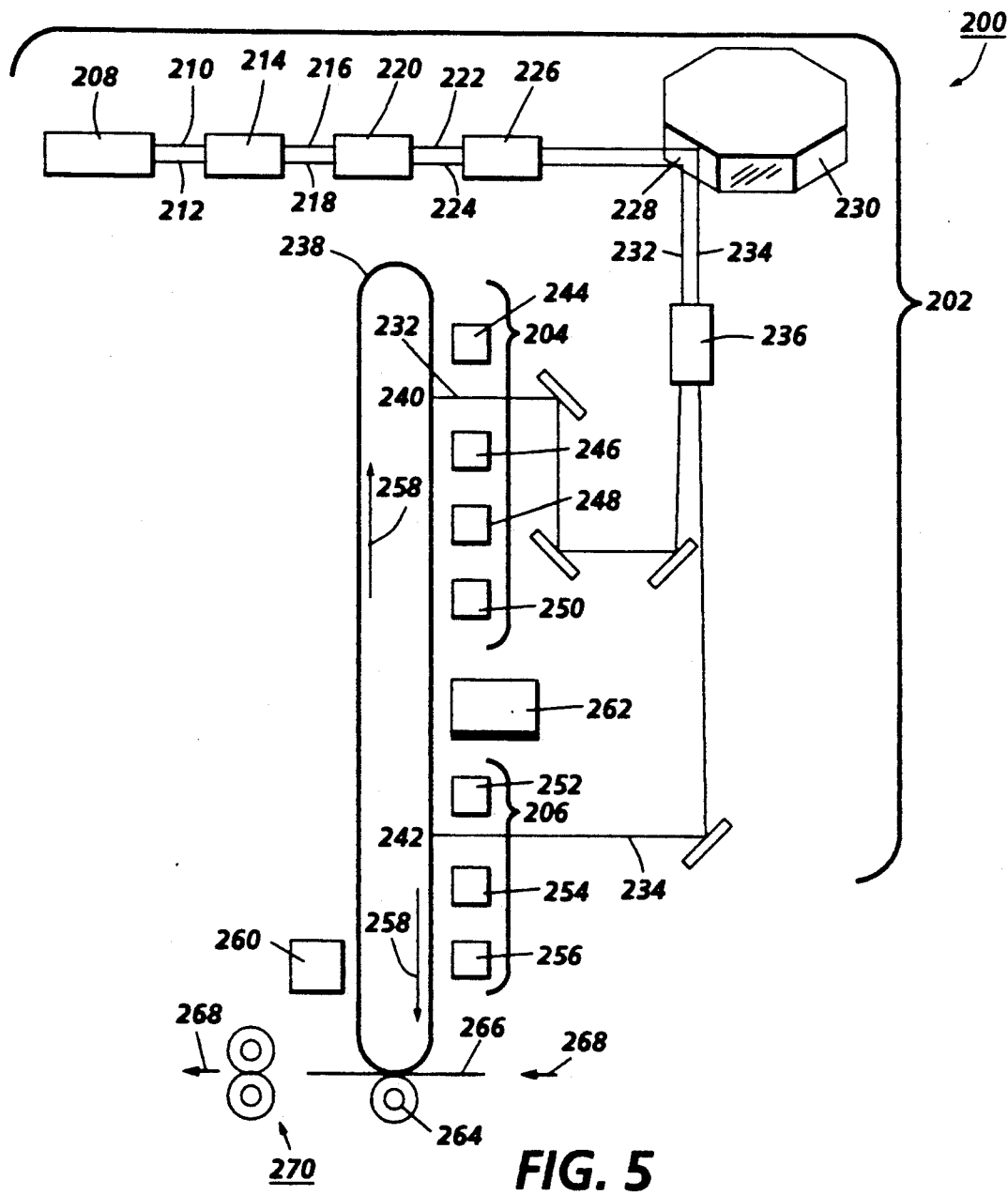
FIG. 5 is a schematic view of the color printing system using a quad-level xerographic unit and a tri-level xerographic unit formed according to the present invention.

Reference is now made to FIG. 5, wherein there is illustrated a single pass full color printing system 200. The color printing system 200 consists generally of a raster output scanner (ROS) optical system 202, a quad-level xerographic unit 204 and a tri-level xerographic unit 206.

In the raster output scanner 202, a light source 208 emits two coherent laser beams 210 and 212 which are collimated and otherwise conditioned by collimating optical element 214. The two collimated beams 216 and 218 are independently modulated by dual channel modulator 220. The two modulated beams 222 and 224 are re-collimated, further conditioned and focused by optical element 226 onto a facet 228 of a rotating multi-faceted polygon mirror 230. The reflected, modulated beams 232 and 234 are imaged and focused by f-theta imaging and distortion correction optical element 236 and reflected by folding mirrors onto the photoreceptor belt 238 at two separate locations 240 and 242.

The first beam 232 is focused at point 240 on the photoreceptor belt 238 between the charging station 244 and the first, second and third developer stations 246, 248 and 250 of the quad-level xerographic unit 204. The second beam 234 is focused at point 242 on the photoreceptor belt 238 between the charging station 252 and the first and second developer stations 254 and 256 of the tri-level xerographic unit 206.

The photoreceptor belt 238 moves in the direction of arrow 258 to advance successive portions of the belt sequentially through the various processing stations disposed about the path of the photoreceptor belt. The belt advances driven by rollers and motors and belt drives (not shown).

Initially, successive portions of the photoreceptor belt 238 pass through a cleaning station 260. The cleaning station removes any residual toner particles and any residual charges from the photoreceptor belt.

The belt 238 next advances through the charging station 244 of the quad-level xerographic unit 204. The charging station charges the belt to a selectively high uniform potential, $V_0$.

The charged belt is then exposed to the modulated light beam 232 from the raster output scanner (ROS) optical scanner, which causes the charged surface of the belt to be discharged in accordance with the modulated output of the beam 232. As previously discussed in this application, this results in four separate and different discharge and exposure levels.

The photoreceptor belt 238 next passes through the first, second and third developer stations 246, 248 and 250 of the quad-level xerographic unit 204. The first developer housing 246 deposits the first toner upon portions or pixels of the photoreceptor belt 238 having the least exposure. The second developer housing 248 deposits the second toner upon portions or pixels of the photoreceptor belt 238 having the most exposure. The third developer housing 250 deposits the third toner upon portions or pixels of the photoreceptor belt 238 having the most exposure and portions or pixels of the photoreceptor belt 238 having the lowest intermediate exposure. No toner is deposited on the photoreceptor belt having high intermediate exposure, as previously discussed. Thus, the quad-level xerographic unit 204 will produce resulting color images on the photoreceptor belt of the first toner, the third toner, the combination of the second and third toner, and no toner.

The photoreceptor belt may then advance through the erasure section 262 which removes any residual charges from the quad-level xerographic unit 204 on the photoreceptor belt. The erasure section does not remove, nor effect, any toner on the belt from the quad-level xerographic unit. The erasure section is optional since the charging station of the next xerographic unit will provide a uniform charge to the belt.

The belt 238 next passes through the charging station 252 of the tri-level xerographic unit 206. The charging station charges the belt to a selectively high uniform potential, $V_0$.

The charged belt is then exposed to the modulated light beam 234 from the raster output scanner (ROS) optical scanner, which causes the charged surface of the belt to be discharged in accordance with the modulated output of the beam 234. As previously discussed in this application, this results in three separate and different discharge and exposure levels; zero exposure, intermediate exposure and full exposure.

The photoreceptor belt 238 next passes through the first and second developer stations 254 and 256 of the tri-level xerographic unit 206. The first developer housing 254 deposits the fourth toner upon portions or pixels of the photoreceptor belt 238 having zero exposure while the second developer housing 256 deposits the fifth toner upon portions or pixels of the photoreceptor belt 238 having full exposure, as previously discussed. No toner is deposited on the photoreceptor belt having intermediate exposure, as previously discussed.

Toner from the developer housings of the second xerographic unit 206 can be deposited on toner on the photoreceptor belt from the developer housings of the first xerographic unit 204.

The photoreceptor belt 238 then advances through the transfer station 264. A sheet of support material 266 is moved into contact with the toner upon the photoreceptor belt 238 at the transfer station 264 to transfer the toner to the sheet 266. The toner deposited upon the belt and thus the toner transferred to the sheet would include toner from both xerographic units 204 and 206.

After transfer, the sheet 266 moves in the direction of arrow 268 which advances the sheet to fusing station 270. Fusing station 270 permanently affixes the transferred toner image to the sheet 266, as previously discussed.

After the toner is separated from the photoreceptor belt, the belt 238 then passes through the cleaning station 260 and the printing cycle is complete. The cleaning station removes any residual toner particles and any residual charges from the photoreceptor belt.

In the single pass full color printing system 200, toner from the second xerographic unit 206 can be deposited on toner previously deposited from the first xerographic unit 204 resulting in toner dot-upon-toner dot pixels on the photoreceptor belt and subsequently on the sheet of support material. The two or three toners from the same xerographic unit cannot, however, be deposited toner dot-upon-toner dot to produce a pixel on the photoreceptor belt.

Toner from the two developer housings of the second xerographic unit 206 can be deposited upon the same spot on the photoreceptor belt as toner deposited from the three developer housings of the first xerographic unit 204. These permutations allow toner of one color deposited on toner of another color to form a pixel of a different color on the photoreceptor.

A full process full color printing system would be able to produce pixels of black and white and all six primary colors; red, green, blue, cyan, magenta and yellow using four color toners: black and the three subtractive primary colors of cyan, magenta and yellow. Pixels of the additive primary colors of blue, red and green would be produced by toner dot upon toner dot of a combination of the three subtractive primary color toners. With the toner dots of the three subtractive primary colors and black without combination with other toner dots, the resulting eight pixels can then be assembled into a full color palette using pixel next to pixel.

The use of black toner in one of the developer stations of the xerographic units presents special circumstances other than the use of toners of any of the primary colors. Black deposited and combined with any other color will produce only black. Thus, any color toner deposited subsequently on black will still yield black and black toner deposited on any color will also yield black. There is no combining of colors possible when black is involved as one of the colors being mixed.

One embodiment of the color printing system of the present invention involves the use of a black toner and three color toners in the five developer stations of the two xerographic units.

In the single pass full color printing system 200 of the present invention, the first toner will be cyan, the second toner will be cyan and the third toner will be magenta in the developer stations 246, 248 and 250 of the quad-level xerographic unit 204 to yield cyan, magenta and blue (cyan and magenta). The fourth toner will be yellow and the fifth toner will be black in the developer stations 254 and 256 of the tri-level xerographic unit 206 to yield yellow and black.

A white pixel is produced by no toner being deposited on the photoreceptor belt 238 and the sheet of support material 266 being white. A black pixel is produced by black toner alone being deposited from the second xerographic unit; or black toner from the second xerographic unit with cyan or magenta or blue toner being deposited from the first xerographic unit; or yellow toner from the second xerographic unit with blue toner being deposited from the first xerographic unit. A yellow pixel is produced by yellow toner alone being deposited from the second xerographic unit. A cyan pixel is produced by cyan toner alone being deposited from the first xerographic unit. A magenta pixel is produced by magenta alone being deposited from the first xerographic unit. A blue pixel is produced by the second cyan toner from the first xerographic unit plus the magenta toner from the first xerographic unit.

A green pixel is produced by depositing cyan from the first xerographic unit and depositing yellow from the second xerographic unit on top of the cyan. A red pixel is produced by depositing magenta from the first xerographic unit and depositing yellow from the second xerographic unit on top of the magenta.

Thus, the color printing system 200 of the present invention would be able to produce pixels of black and white and all six primary colors; red, green, blue, cyan, magenta and yellow for full color.

It is not essential that the black toner be in the second developer housing of the tri-level xerographic unit and the yellow toner be in the first developer housing unit. The color printing system of the present invention will produce the same color scheme with black toner in the first developer housing and yellow toner in the second developer housing of the tri-level xerographic unit. Similarly, the color printing system of the present invention will produce the same color scheme with magenta in the first and second developer housing and cyan toner in the third developer housing of the quad-level xerographic unit.

The toner colors must be a combination of black and the subtractive primary colors; cyan, yellow and magenta.

The general rule for selection of toners for the five developer stations in the two xerographic units is that the tri-level xerographic unit contain toners of black and one of the three subtractive primary colors. The quad-level xerographic unit should have toners of the two remaining subtractive primary colors with the third toner color also being one of those two remaining subtractive primary colors which combines with the other of those two remaining subtractive primary colors to form an additive primary color.

It is also not essential that the quad-level xerographic unit is first in tandem with the tri-level xerographic unit. The color printing system of the present invention will produce the same full color printing system with the tri-level xerographic unit first in tandem with the quad-level xerographic unit.

The hue of a color is the primary colors. The saturation of a color extends from the greyest to its most vivid color. The lightness of a color extends from black through a series of gradually lightening greys to white.

In either embodiment, the human eye can not perceive the individual colored spots produced by the color printing system 200. The eye blurs clusters of color pixels together to discern a hue, saturation and lightness that it discerns as a color. Typically, depending upon the size of the individual spot, these pixels can be clustered in a 2 by 4 or a 3 by 3 matrix of individual pixels.

The individual pixels within the matrix can be the same color or different colors. If the individual spots are the same color, then that pixel will be of the strongest saturation of that color, the most vivid shade of that color. By having different colors for the pixels in the matrix, the saturation and hue of the pixel will vary.

By having the pixels in the matrix be exclusively from two adjacent colors in the spectrum, the resulting pixel matrix color will be along the hue boundary between the colors and of the strongest saturation. By having the pixels in the matrix be exclusively from two non-adjacent colors in the spectrum, the resulting pixel matrix color will be of varying hues and saturation. By having the pixels of the matrix be of three or more colors, the hue and saturation of the pixel matrix will vary.

The lightness and darkness of the color produced by the color printing system 200 is achieved by adding white or black color pixels to the matrix. For example, pink, or light red, is printed by having a pixel matrix of 50% red and 50% white.

Another embodiment of the color printing system of the present invention does not involve the use of a black toner in any of the five developer stations of the two xerographic units.

In the single pass full color printing system 200 of the present invention, the first toner will be cyan, the second toner will be cyan and the third toner will be magenta in the developer stations 246, 248 and 250 of the quad-level xerographic unit 204. The fourth toner will be yellow and the fifth toner will be any color in the developer stations 254 and 256 of the tri-level xerographic unit 206.

A white pixel is produced by no toner being deposited on the photoreceptor belt 238 and the sheet of support material 266 being white. A black pixel is produced by yellow toner alone being deposited from the second xerographic unit and blue toner being deposited from the first xerographic unit. A yellow pixel is produced by yellow toner alone being deposited from the second xerographic unit. A cyan pixel is produced by cyan toner alone being deposited from the first xerographic unit. A magenta pixel is produced by magenta alone being deposited from the first xerographic unit. A blue pixel is produced by the second cyan toner from the first xerographic unit plus the magenta toner from the first xerographic unit.

A green pixel is produced by depositing cyan from the first xerographic unit and depositing yellow from the second xerographic unit on top of the cyan. A red pixel is produced by depositing magenta from the first xerographic unit and depositing yellow from the second xerographic unit on top of the magenta.

Thus, the color printing system 200 of the present invention would be able to produce pixels of black and white and all six primary colors; red, green, blue, cyan, magenta and yellow for full color. The fifth toner can be one of the primary colors, even one of the additive primary colors, or a non-primary color, such as brown, gold or orange, for specialty color printing in addition to the full color. The fifth toner may also be ultraviolet ink or infrared ink or magnetic ink.

The toner colors must be a combination of the subtractive primary colors; cyan, yellow and magenta.

The general rule for selection of toners for the five developer stations in the two xerographic units is that the tri-level xerographic unit contain toner of one of the three subtractive primary colors. The quad-level xerographic unit should have toners of the two remaining subtractive primary colors with the third toner color also being one of those two remaining subtractive primary colors which combines with the other of those two remaining subtractive primary colors to form an additive primary color. The additive primary color formed from the quad-level xerographic unit when combined with its complimentary subtractive primary color from the tri-level xerographic unit will form black. The switching of the sequencing of the specific toner colors within the developer housings of the two xerographic units of this embodiment is the same as the first embodiment.

Figure 6:
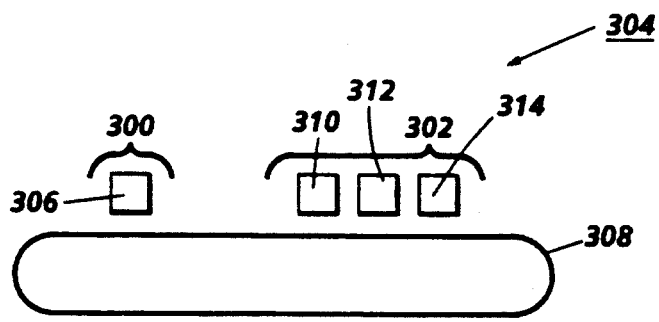
FIG. 6 is a schematic view of the color printing system using a bi-level xerographic unit and a quad-level xerographic unit formed according to the present invention.

Since the fifth toner from the second developer housing of the tri-level xerographic unit is not needed for a non-black toner full color printing system, a bi-level xerographic unit 300 in tandem with a quad-level xerographic unit 302 and a raster output scanner (ROS) optical system (not shown) will form a non-black toner full color printing system 304 in FIG. 6. The various cleaning station, charging stations, erasure stations, transfer station and fusing stations of the non-black toner full color printing system 304 of FIG. 6 would be the same as the single pass full color printing system 200 of FIG. 5 and are not shown in FIG. 6. The bi-level xerographic unit 300 has a single developer housing 306 for depositing a single color toner upon the photoreceptor belt 308. The quad-level xerographic unit 302 has three developer housings 310, 312 and 314 for depositing three toners of different colors upon the photoreceptor belt 308.

The non-black toner full color printing system 304 will have the same toner color pattern as the non-black toner full color printing system 200 utilizing a quad-level xerographic unit and a tri-level xerographic unit. The single developer housing 306 of the bi-level xerographic unit 300 can have yellow toner and the three developer housings 310, 312 and 314 can have, respectively, cyan, cyan and magenta toners.

A white pixel is produced by no toner being deposited on the photoreceptor belt 308 and the sheet of support material being white. A black pixel is produced by yellow toner alone being deposited from the first xerographic unit and blue toner being deposited from the second xerographic unit. A yellow pixel is produced by yellow toner alone being deposited from the first xerographic unit. A cyan pixel is produced by cyan toner alone being deposited from the second xerographic unit. A magenta pixel is produced by magenta alone being deposited from the second xerographic unit. A blue pixel is produced by the second cyan toner from the second xerographic unit plus the magenta toner from the second xerographic unit.

A green pixel is produced by depositing yellow from the first xerographic unit and depositing cyan from the second xerographic unit on top of the yellow. A red pixel is produced by depositing yellow from the first xerographic unit and depositing magenta from the second xerographic unit on top of the yellow.

Thus, the color printing system 300 of the present invention would be able to produce pixels of black and white and all six primary colors; red, green, blue, cyan, magenta and yellow for full color.

The general rule for selection of toners for the four developer stations in the two xerographic units is that the bi-level xerographic unit contain toner of one of the three subtractive primary colors. The quad-level xerographic unit should have toners of the two remaining subtractive primary colors with the third toner color also being one of those two remaining subtractive primary colors which combines with the other of those two remaining subtractive primary colors to form an additive primary color.

The additive primary color formed from the quad-level xerographic unit when combined with the subtractive primary color from the tri-level xerographic unit will form black.

It is also not essential that the bi-level xerographic unit is first in tandem with the quad-level xerographic unit. The color printing system of the present invention will produce the same full color printing system with the quad-level xerographic unit first in tandem with the bi-level xerographic unit.

A single pass full color printing system can also consist generally of a raster output scanner (ROS) optical system, a first quad-level xerographic unit in tandem with a second quad-level xerographic unit.

In general, with regard to all the embodiments of the color printing systems, if the sheet of support material is not white, then a white toner may be used within the developer housings of the xerographic units.

If the first and second modulated beam have the same wavelength, then the color printing system has simpler modulator and optical elements which do not have to be calibrated for two wavelengths and an easier calculation of the optical paths of the two beams. The optical paths of the two beams should be the same length, although it is not impossible to have differing lengths for the optical paths. The dual channel modulator may be able to compensate for any difference in lengths of the optical paths.

The use of a dual beam light source with the two emitted beams sharing the same optical elements in the raster output scanner optical system provides improved pixel placement accuracy upon the photoreceptor belt since a common polygon facet is used. The use of quad-level and tri-level xerographic units also aids in pixel placement accuracy upon the photoreceptor belt. Sharing the optical components also reduces the physical size, the number of optical elements and the costs of the single pass full color printing system.

However, the sharing of optical elements by the dual beams is merely an illustrative example of the color printing system. Two separate light sources could each emit a beam. Each beam could have a separate ROS optical system or just share certain ROS optical elements, like the facet of the rotating polygon mirror. A single light should emit a single beam which is split by beam splitting means anywhere along the ROS optical system, prior to the two tri-level xerographic units.

The photoreceptor belt of the present invention can, in the alternative, be a drum photoreceptor or other equivalents. The rotating polygon raster output scanner (ROS) optical system 202 can, in the alternative, be a LED image bar or other equivalents.

The light source 208, the collimating optical element 214 and the dual channel modulator 220 can be replaced by a diode laser which is modulated electronically.

There are alternate quad-level xerographic units for carrying out the desired formation of three different color pixels on the photoreceptor means of the present invention. Some of these alternatives, such a U.S. Pat. No. 5,049,949, assigned to the same assignee as the present invention and herein incorporated by reference, do not use the combining of two color toners to form a third color pixel on the photoreceptor means, but rather directly deposit three different color toners upon the photoreceptor means without combination. It should be noted that these other quad-level xerographic units are equally applicable to the present invention.

Similarly, there are alternate tri-level xerographic units for carrying out the desired formation of two different color pixels on the photoreceptor means of the present invention, which are equally applicable to the present invention.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A single pass full color printing system comprising:
   a raster output scanner optical system for generating a first modulated beam and a second modulated beam,
   a photoreceptor means,
   a quad-level xerographic unit for charging said photoreceptor means, said photoreceptor means then being exposed to said first modulated beam, said quad-level xerographic unit having means for depositing a first color toner, a second color toner, and a third color toner on said photoreceptor means based on the charge, after exposure to said first modulated beam, and
   a tri-level xerographic unit for charging said photoreceptor means, subsequent to said quad-level xerographic unit, said photoreceptor means then being exposed to said second modulated beam, said tri-level xerographic unit having means for depositing a fourth color toner and a fifth color toner on said photoreceptor means based on the charge, after exposure to said second modulated beam, whereby said color toners produce pixels for black and white and all six primary colors.

2. The single pass full color printing system of claim 1 further comprising:
   means for transferring said toners upon said photoreceptor means onto a sheet of support material.

3. The single pass full color printing system of claim 1 further comprising:
   erasure means between said quad-level xerographic unit and said tri-level xerographic unit for removal of any residual charge on said photoreceptor means.

4. The single pass full color printing system of claim 1 wherein said photoreceptor means is a photoreceptor belt.

5. The single pass full color printing system of claim 1 wherein said photoreceptor means is a photoreceptor drum.

6. The single pass full color printing system of claim 1 wherein said first color toner and said third color toner are toners of two subtractive primary colors with the second toner color being the same as said first color toner to form an additive primary color upon said photoreceptor means when combined with said third toner color, one of said fifth and sixth color toners being the remaining subtractive primary color.

7. The single pass full color printing system of claim 6 wherein the other of said fifth and sixth color toners being black.

8. The single pass full color printing system of claim 6 wherein said first color toner and said second color toner are cyan, said third toner color is magenta, and said fourth toner color is yellow.

9. The single pass full color printing system of claim 7 wherein said fifth color toner is black.

10. A single pass full color printing system comprising:
    a raster output scanner optical system for generating a first modulated beam and a second modulated beam,
    a photoreceptor means,
    a quad-level xerographic unit for charging said photoreceptor means, said photoreceptor means then being exposed to said first modulated beam, said quad-level xerographic unit having means for depositing a first color toner, a second color toner, and a third color toner on said photoreceptor means based on the charge, after exposure to said first modulated beam, and
    a bi-level xerographic unit for charging said photoreceptor means, subsequent to said quad-level xerographic unit, said photoreceptor means then being exposed to said second modulated beam, said bi-level xerographic unit having means for depositing a fourth color toner on said photoreceptor means based on the charge, after exposure to said second modulated beam, whereby said color toners produce pixels for black and white and all six primary colors.

11. A single pass full color printing system comprising:
    a raster output scanner optical system for generating a first modulated beam and a second modulated beam,
    a photoreceptor means, a first quad-level xerographic unit for charging said photoreceptor means, said photoreceptor means then being exposed to said first modulated beam, said first quad-level xerographic unit having means for depositing a first color toner, a second color toner, and a third color toner on said photoreceptor means based on the charge, after exposure to said first modulated beam, and
    a second quad-level xerographic unit for charging said photoreceptor means, subsequent to said first quad-level xerographic unit, said photoreceptor means then being exposed to said second modulated beam, said second quad-level xerographic unit having means for depositing a fourth color toner, a fifth color toner, and a sixth color toner on said photoreceptor means based on the charge, after exposure to said second modulated beam, whereby said color toners produce pixels for black and white and all six primary colors.

* * * * *